United States Patent
Berny et al.

(10) Patent No.: US 11,618,204 B2
(45) Date of Patent: Apr. 4, 2023

(54) THERMOFORMED ARTICLE OF POLY(ETHYLENE 2,5 FURANDICARBOXYLATE) POLYESTER

(71) Applicant: Furanix Technologies B.V., Amsterdam (NL)

(72) Inventors: Benoit Jacques Berny, Amsterdam (NL); Francesco Acquasanta, Amsterdam (NL); Julia Thérèse Paulette Flacelière, Amsterdam (NL); Jesper Gabriël van Berkel, Amsterdam (NL)

(73) Assignee: Furanix Technologies B.V., Amsterdam (NL)

( * ) Notice: Subject to any disclaimer, the term of this patent is extended or adjusted under 35 U.S.C. 154(b) by 962 days.

(21) Appl. No.: 16/463,498

(22) PCT Filed: Nov. 28, 2017

(86) PCT No.: PCT/NL2017/050786
§ 371 (c)(1),
(2) Date: May 23, 2019

(87) PCT Pub. No.: WO2018/097728
PCT Pub. Date: May 31, 2018

(65) Prior Publication Data
US 2019/0366616 A1    Dec. 5, 2019

(30) Foreign Application Priority Data
Nov. 28, 2016  (NL) .................................. 2017874

(51) Int. Cl.
*B29C 51/00* (2006.01)
*B29C 51/14* (2006.01)
*B29K 67/00* (2006.01)

(52) U.S. Cl.
CPC ............ *B29C 51/002* (2013.01); *B29C 51/14* (2013.01); *B29K 2067/00* (2013.01); *B29K 2995/0088* (2013.01)

(58) Field of Classification Search
CPC ..... B29C 51/14; B29C 51/002; B29C 51/428; B29K 2067/00; B29K 2995/0088
See application file for complete search history.

(56) References Cited

U.S. PATENT DOCUMENTS

| 2,551,731 | A | 5/1951 | Drewitt et al. |
| 9,228,051 | B2 | 1/2016 | Carman, Jr. et al. |
| 2015/0343746 | A1 | 12/2015 | Bhattacharjee et al. |
| 2017/0145153 | A1 | 5/2017 | Jacquel et al. |

FOREIGN PATENT DOCUMENTS

| CN | 101844399 A | 9/2010 |
| CN | 104144967 A | 11/2014 |
| JP | 2010-280767 A | 12/2010 |
| JP | 2013-155389 A | 8/2013 |
| NL | 2015264 B1 | 2/2017 |
| NL | 2015266 B1 | 2/2017 |
| WO | 2013/097013 A1 | 7/2013 |
| WO | 2015/031910 A1 | 3/2015 |
| WO | 2015/137805 A1 | 9/2015 |
| WO | 2015/170050 A1 | 11/2015 |
| WO | 2016/032330 A1 | 3/2016 |
| WO | 2016/130748 A1 | 8/2016 |

OTHER PUBLICATIONS

Translation of CN104144967 (Year: 2014).*
Chinese Office Action, Chinese Patent Application No. 201780072173. 6, dated Jan. 6, 2021, 17 pages.
De Guzman, Doris, "Avantium, Wifag-Polytype on thermoformed PEF", Oct. 13, 2013, XP-002769574, pp. 1-3.
Gruter, G.J., "PEF, a 100% bio-based polyester: Synthesis, Properties & Sustainability", 2015, XP002769575, pp. 1-23.

* cited by examiner

Primary Examiner — Monica A Huson
(74) Attorney, Agent, or Firm — Hoffmann & Baron, LLP

(57) ABSTRACT

Thermoformed article including poly(ethylene-2,5-furandicarboxylate) polyester, which polyester has a weight average molecular weight (Mw) of at least 50,000, determined by gel permeation chromatography using polystyrene as standard and which polyester is semicrystalline, is prepared in a process including: providing a sheet that includes poly(ethylene-2,5-furandicarboxylate) polyester, which polyester has a weight average molecular weight (Mw) of at least 50,000, determined by gel permeation chromatography using polystyrene as standard and which polyester is semicrystalline; heating the sheet to a temperature above its glass transition temperature to obtain a pliable sheet; shaping the pliable sheet in a mold to a desired shape to obtain a pliable shaped article; cooling the pliable shaped article; and releasing the thus cooled shaped article from the mold.

16 Claims, No Drawings

THERMOFORMED ARTICLE OF POLY(ETHYLENE 2,5 FURANDICARBOXYLATE) POLYESTER

CROSS-REFERENCE TO RELATED APPLICATIONS

This application is the National Stage of International Application No. PCT/NL2017/050786, filed Nov. 28, 2017, which claims the benefit of Netherlands Application No. NL 2017874, filed Nov. 28, 2016, the contents of which is incorporated by reference herein.

FIELD OF THE INVENTION

The present invention relates to a thermoformed article comprising poly(ethylene-2,5-furandicarboxylate) polyester, and to a process for thermoforming a sheet comprising poly(ethylene-2,5-furandicarboxylate) polyester.

BACKGROUND OF THE INVENTION

Poly(ethylene-2,5-furandicarboxylate) polyester (PEF) is a polyester that has been known for a long time. The polyester has been described in U.S. Pat. No. 2,551,731. However, it was not until the $21^{st}$ century that the development of this polyester has gained revived interest. The polyester was found to have excellent properties. The suitability of PEF in the preparation of bottles, films and fibers is disclosed in WO 2013/062408. According to this application the polyesters with a number average molecular weight of at least 25,000 (as determined by GPC based on polystyrene standards) are very suitable for the preparation of packaging material because the material has excellent barrier properties for oxygen, carbon dioxide and water. These barrier properties are such that the polyester was held excellently suitable for the manufacture of a carbonated soft drinks container. The application describes the preparation of a bottle by injection blow molding of a preform. It is stated that in the blow molding process the stretch ratios for a preform made from PEF are higher than for conventional PET (poly(ethylene-terephthalate) bottles. The optimum axial stretch ratio may be in the range of 2.0 to 4.0 and the optimum radial ratios may be in the range of 5.0 to 7.0. In an example it is shown that the oxygen barrier properties of such a bottle are five-fold better than those for a PET bottle, and for $CO_2$ the barrier properties were two times better.

In WO 2016/032330 it was found that when a sheet from a PEF resin with a thickness of at most 2.5 mm is stretched with a stretch ratio of at least 4, the resulting film not only has excellent mechanical properties, but also improved barrier properties in comparison with the shown barrier properties of the bottle according to WO 2013/062408. The films that are described in this WO 2016/032330 application may have an oxygen permeability of at most 0.7 cc-mm/$m^2$*day*atm, determined according to ASTM D-3985 at a temperature of 23° C. and a relative humidity of the oxygen of 0%. They may also have a $CO_2$ permeability of at most 3.0 cc-mm/$m^2$*day*atm, at a temperature of 32° C. and a relative humidity of the $CO_2$ of 0%. The films according to WO 2016/032330 are prepared by stretching a cooled sheet of PEF in at least one direction with a stretch ratio of at least 4/1 at a temperature in the range of 90 to 130° C., yielding an oriented film.

The above-mentioned WO-applications only refer to blow molding and stretching as preparation methods for articles made from PEF.

In U.S. Pat. No. 9,228,051 a polyester is described that comprises 2,5-furandicarboxylic acid groups and cyclohexanediol residues which polyester further comprise the residues of a so-called modifying glycol, e.g. ethylene glycol. The polyesters according to U.S. Pat. No. 9,228,051 are stated to be superior to polyesters known in the art with respect to stable glass transition temperatures (Tg's). The polyesters according to U.S. Pat. No. 9,228,051 may be used for the manufacture of films, injection molded products, extrusion coatings, fibres, foams, thermoformed products, extruded profiles and sheets, extrusion blow molded articles, injection blow molded articles, rotomolded articles and stretch blow molded articles. Reference is made to the use of such polyesters for the manufacture of thermoformed articles such as food packaging and thermoformed foam sheets. In a comparative experiment PEF is prepared. Comparison with other polyesters shows that the Tg's of polyesters of furandicarboxylic acid, cyclohexanedimethanol and ethylene glycol with different ratios of the diol components appear to have similar Tg's. U.S. Pat. No. 9,228,051 does not describe a thermoforming experiment of any of the polyesters.

WO2015/170050 describes polyesters comprising furandicarboxylic acid groups, tetrahydrofurandimethanol residues and moieties of another aliphatic diol. The other aliphatic diol may be ethylene glycol. In a comparative experiment PEF is prepared having a weight average molecular weight (Mw) of 18,450. WO 2015/1700750 states that the use of tetrahydrofurandimethanol as diol component in the polyester allows the preparation of higher molecular weight polyesters. The Tg's of the polyesters according to the examples of WO 2015/170050 are all lower than the Tg of PEF. WO 2015/170050 mentions that articles may be made from the polyesters according to the invention described therein by extrusion molding, thermoforming or injection molding. No thermoforming process or thermoformed articles are shown.

WO 2016/130748 discloses multilayer containers, wherein preforms consisting of a multilayer polyester are subjected to injection stretch blow molding to obtain a container. The multilayer may be a three-layer preform, wherein the outer and inner layers consist of PET and then intermediate layer comprises a furandicarboxylate polyester or copolyester, e.g. PEF. The result is a container with allegedly improved barrier properties.

In JP2013-155389 a resin composition is described that comprises a polyester having a 2,5-furandicarboxylate unit as the dicarboxylic acid unit, and 1,3-propanediol and/or ethylene glycol groups as a diol unit, which polyester has a reduced viscosity ($\eta_{sp}$/c) of 0.5 dL/g or more, and a terminal acid value of less than 200 µeq/g. The polyester can be subjected to various methods of shaping, including compression molding, injection molding, extrusion molding and coextrusion molding, stretching molding, foam molding, thermoforming, powder molding, various nonwoven fabric molding such as dry method, adhesion method, entangling method, spunbond method, etc. and the like. The application does not provide examples of any of these shaping methods. The application is also silent about the conditions of the polyester which could contribute to the suitability of the resin for any on these shaping methods.

SUMMARY OF THE INVENTION

It has now been found that the thermoforming of a PEF-comprising polyester sheet is very advantageous if the molecular weight of the polyester is sufficiently high and when the polyester is semicrystalline. The thermoformed article shows reduced shrinkage when exposed to contact with hot liquids or gases. Accordingly, the present invention provides a thermoformed article comprising poly(ethylene-2,5-furandicarboxylate) polyester, which polyester has a weight average molecular weight (Mw) of at least 50,000, determined by gel permeation chromatography using polystyrene as standard and which polyester is semicrystalline.

It has been found that such a thermoformed article shows a reduced shrinkage performance and also good other mechanical properties. The use of the polyesters with such a high Mw allows the sheet to be subjected to a thermoforming process for the manufacture of polyester articles with low shrinkage and a high gas barrier performance in a single layer. This process avoids a process of making preforms as intermediate product and subjecting such intermediate products to a more expensive injection stretch blow molding process or an injection molding process which requires a more expensive double-sided mold. Moreover, with some strain induced crystallization thermoforming enables the enhancement of mechanical, thermal and barrier properties of the thermoformed article.

DETAILED DESCRIPTION OF THE INVENTION

The polyester that is used in the articles of the present invention is a poly(ethylene-2,5-furandicarboxylate) polyester. Such a polyester has been manufactured from monomers comprising ethylene glycol and 2,5-furandicarboxylic acid. It is understood that such a polyester may comprise residues of diols different from ethylene glycol and residues of diacids, other than 2,5-furandicarboxylic acid. The residues of other diols include those of 1,2-propane diol, 1,3-propane diol, 1,4-butane diol, 1,6-hexane diol, 1,4-bis(hydroxymethyl) cyclohexane, 2,2,4,4-tetramethylcyclobutane-1,3-diol and isosorbide. Other diols include the oligomers of ethylene glycol, such as diethylene glycol and triethylene glycol. Other diacids that may be used in the preparation of the polyester used in the present invention include adipic acid, succinic acid, maleic acid, terephthalic acid, isophthalic acid, phthalic acid and the isomers of cyclohexane dicarboxylic acid and tetrahydrofuran dicarboxylic acid. The amount of other diol or diacid residues is suitably at most 10 mol %, based on the molar amount of 2,5-furandicarboxylate moieties. More preferably, the polyester essentially consists of ethylene and 2,5-furandicarboxylate moieties. In practice that means that in the preparation of the polyester no other monomers have been deliberately added. However, any di- and/or triethylene glycol that may be formed during the polymerization process may be present in the eventual polyester. In U.S. Pat. No. 8,420,769 polyesters are described that have been prepared from ethylene glycol and 2,5-furandicarboxylic acid and which have a $^1$H-NMR spectrum showing small peaks at shifts of about 4.2 and 4.8 ppm, indicating diethylene glycol moieties. From the peaks it can be deduced that the amount of diethylene glycol moieties is about 0.05 mol/mol, based on the amount of furandicarboxylate moieties. In WO2015137805 improved polyesters have been described, wherein the content of diethylene glycol residues is less than 0.045, in moles per mole of 2,5-furandicarboxylate moieties. Thus the amount of diethylene and triethylene glycol residues in the polyester is typically in the range of 5 to 0.1% mol, suitably in the range of 4 to 0.5% mol, based on the number of moles of furandicarboxylate moieties.

The weight average molecular weight of the polyester that is used in the articles of the present invention is at least 50,000. When the skilled person would want to increase the Mw of the polyester, e.g. as the batch of polyester at hand has an Mw below 65,000, or if the skilled person wants to further increase the Mw above the value of 65,000, it is advantageous that the polyester comprises a branching agent. Such addition of a branching agent may be done during the polymerization of the monomers. In such a case a polyol with more than two hydroxyl moieties per molecule may be added. Examples of such polyols include glycerol, pentaerythritol, sorbitol, hexane triol-1,2,6, trimethylol ethane, trimethylol propane, and similar compounds up to trimethylol hexane, or aromatic compounds such as trimethylol benzene-1,3,5 and combinations thereof. Alternative polyacid monomers include furan-tricarboxylic acid, furan tetracarboxylic acid and benzene derived carboxylic acids, such as pyromellitic acid, benzene tricarboxylic acid, such as hemimellitic acid or trimellitic acid, or mellitic acid. These branching agents do not only increase the molecular weight, but they also influence the rheological properties of the polyester. The branching agents cause a cross-linked network. So, the presence of branching agents leads to more strain and molecular orientation during the thermoforming process. This typically results in an enhanced crystallinity of the polyester. The branching agents-containing polyester also shows an increased tendency to crystallize further during additional heating.

Alternative branching agents are disclosed in WO2015/031910 and NL 2015266. These branching agents may be added to the polyester in an extruder. During the extrusion the branching agent molecules react with the polyester and create a network. NL 2015266 describes branching agents, selected from an oligomeric or polymeric compound having two or more functional groups. Preferably these functional groups have been selected from carbodiimide and epoxide groups. The branching agents, also known as extending agents, comprise an oligomeric or polymeric backbone of styrene units or ethylene units, acrylate and/or methacrylate units and epoxide functional groups. More preferably the chain extending agent comprises a carbodiimide of formula (I)

$$R_1[-N=C=N-R_2-]_n-R_3 \qquad (I)$$

wherein $R_1$ and $R_3$ are independently selected from an organic group, preferably an isocyanate or capped isocyanate group, and $R_2$ represents an aliphatic, alicyclic or aromatic group and n represents an integer in the range of 2 to 1000.

As described in WO2015/031910 the branching agent may be suitably added to achieve higher melt strength in the final material. In an embodiment of this application, this effect may be employed by the skilled person to avoiding excessive sagging when heated to elevated temperatures, e.g., in an infrared oven. In connection with thermoforming sagging can occur particularly with a sheet when it is wider than 0.5 m. In extreme situations the sagging of the sheet may then result in the sheet coming into physical contact with a bottom oven by gravity and causing either machine blocking or fire.

It has been found advantageous to use branching agents that are added as co-monomer during the polymerization. In particular the polyols are suitable as co-monomer. Preferably branching agent is a polyol, having 3 to 6 hydroxyl groups. More preferably, the polyol is selected from a glycerol, pentaerythritol, sorbitol, hexane triol-1,2,6, trimethylol ethane, trimethylol propane and mixtures of one or more thereof.

The amount of branching agent in the polyester can vary, dependent on the degree in which the skilled person wants to increase the molecular weight and the molecular weight of the polyester before the addition of the branching agent. Typically, the branching agent is added to the polyester, such that the polyester comprises the branching agent in an amount up to 5% wt, preferably in the range of 0.01 to 2.5% wt, more preferably in the range of 0.05 to 2.0% wt, based on the weight of the polyester.

The weight average molecular weight (Mw) of the polyester is at least 50,000, suitably at least 65,000. Preferably, the Mw of the polyester is at least 69,000. The Mw is suitably enhanced to very high values, e.g., up to 500,000. More preferably, the Mw is suitably up to 150,000. Most preferably, the Mw of the polyester is in the range of 70,000 to 125,000.

The thermoformed article may comprise substantially amorphous polyester. Such articles have retained their optical clarity. However, it has been found that it is advantageous that the polyester in the thermoformed article not only comprises a sufficiently high molecular weight, but that it also is not completely amorphous, i.e. that it is semicrystalline. When the polyester is in the semicrystalline state the thermoformed article shows a further improvement in the shrinkage performance. This represents another advantage of the thermoformed article over the injection molded article. In thermoforming the formation of an amount of strain induced crystallization easily takes place, and quiescent crystallization can easily be attained, both of which are more difficult to realize in injection molding of containers of a slow crystallizing material, such as poly(alkyene-2,5-furandicarboxylate).

Polyester crystallinity can be determined with Differential Scanning calorimetry (DSC) by quantifying the heat associated with melting of the polymer. The crystallinity is often expressed as net enthalpy of melting in terms of number of Joules per gram which number is derived from the DSC technique in accordance with ISO11357. It is evident that the heat that is associated with the melting of the polymer is not solely dependent on the degree of crystallinity but also on the polymer itself. Therefore, the crystallinity can satisfactorily be expressed as the percentage of crystallinity. For pure poly(ethylene furandicarboxylate) the heat of 100% crystalline polyester amounts to $\Delta H$ of 140 J/g. For semicrystalline polyesters of pure poly(ethylene furandicarboxylate) the $\Delta H$ is determined and the fraction, as percentage of $\Delta H$=140 J/g for 100% crystalline polyester, is recorded. For the articles according to the present invention the semicrystalline polyester has suitably a crystallinity of 5 to 75%, preferably from 10 to 50%, more preferably from 20 to 40%. The crystallinity of the polyester can be enhanced by keeping the polyester for a period at an elevated temperature. Suitable temperatures include those in a range of 90 to 180° C., preferably from 100 to 160° C., more preferably from 105 to 155° C. The polyester is suitably kept at such elevated temperatures for a period in the range of 0.1 to 4 hrs, preferably from 0.25 to 3 hrs, more preferably from 0.3 to 2 hrs. The crystallinity in the thermoformed article can be achieved via the use of a semicrystalline starting material. Preferably, the crystallinity of the polyester in the thermoformed article is obtained from the use of a sheet comprising the polyester which is semicrystalline before thermoforming. Alternatively, the crystallinity of the polyester in the thermoformed article may have been obtained by the thermoforming process and the associated strain induced crystallinity.

The polyester that forms part of the article according to the present invention has a glass transition temperature (Tg). As commonly known, the glass transition temperature refers to the temperature at which a reversible transition in amorphous materials or in amorphous regions within semicrystalline materials from a hard and relatively brittle state into a viscous or rubbery state takes place. The Tg is generally determined in accordance with ISO11357-2. The polyester that is used in the present invention suitably has a Tg in the range of 72 to 90° C., preferably from 75 to 88° C.

The crystallization of poly(ethylene-2,5-furandicarboxylate) tends to be rather slow. The crystallization is slower than polyethylene terephthalate, i.e. another polyester. When a semicrystalline polyester is desired in the thermoformed article it is advantageous that crystallinity can develop rapidly during either cooling of the sheet, heating of the sheet to thermoforming temperature or holding the sheet into a heated mold, also known as heat setting, or a combination thereof, to allow high cycle times, Therefore, it is advantageous that the poly(ethylene-2,5-furandicarboxylate) comprises a nucleating agent. Suitable nucleating agents are described in NL2015264. Such suitable agents include compounds selected from the group consisting of inorganic compounds, organic salts, organic acids, waxes, polymers and combinations thereof. Examples of inorganic compounds may be selected from the group consisting of talc, titanium dioxide, silica, boron nitride, metal carbonate, clays, metal silicates and combinations thereof. A suitable organic compound may be an organic salt of the group selected from a metal salt of an optionally substituted aliphatic $C_8$-$C_{30}$-carboxylic acid, optionally substituted aromatic acid, optionally substituted aromatic diacid, optionally substituted cycloaliphatic dicarboxylic acid and combinations thereof. Another suitable organic compound may be an organic acid, selected from the group consisting of aromatic carboxylic acid, heteroaromatic carboxylic acid, saturated heterocyclic carboxylic acid, unsaturated heterocyclic carboxylic acid, hydroxyl group-containing mono- and diacid having from 4 to 12 carbon atoms, and combinations thereof. A suitable polymer may be selected from the group consisting of PET (polyethylene terephthalate), PBT (polybutylene terephthalate), PEG (polyethylene glycol), poly (ethylene-co-methacrylic acid), and combinations thereof. A preferred nucleating agent comprises saccharin or a salt thereof. The amount of nucleating agent in the combination of polyester and nucleating agent may be in the range of 0.01 to 30% wt, and is preferably from 0.01 to 3% wt, more preferably from 0.05 to 3% wt, and most preferably from 0.1 to 2.5% wt, based on the weight of the polyester.

The article according to the present invention may consist of the poly(ethylene-2,5-furandicarboxylate). However, the article may also comprise one or more additional polymers, in addition to the poly(ethylene-2,5-furandicarboxylate). Such additional polymers may especially be added when they provide a desirable property. The barrier properties as to air permeation, carbon dioxide permeation and water permeation as shown by poly(ethylene-2,5-furandicarboxylate) are excellent. When the articles are exposed to high pressures and/or high temperatures, especially when the articles are used in hot fill applications, it may be desirable to apply additional polymers in the articles. These additional polymers may suitably be selected from the group consisting of polyolefins, polystyrene, polyalkylene arylates (such as polyalkylene terephthalates and polyalkylene naphthalates), polyamides, polyvinylalcohol, polylactic acid, polyacrylates, polymethacrylates, polycarbonates and mixtures thereof. Suitable polyolefins are polyethylene, polypropylene, polybutylene, but also copolymers of ethylene and propylene, or copolymers of ethylene and butylene. Such latter polyolefins may be derived from the hydrogenation of polyisoprene or polybutadiene. Suitable polyalkylene terephthalates and naphthalates include polyethylene terephthalate or naphthalate, poly(trimethylene terephthalate) or poly (trimethylene naphthalate), poly(1,4-butylene terephthalate or naphthalate) or copolymers or mixtures thereof. Suitable polyamides include nylon-6, nylon-6,6 and mixtures thereof. Suitable polyacrylates or polymethacrulates are typically the polymers of the $C_1$-$C_4$ alkyl esters of acrylic acid or methacylic acid. The weight average molecular weight of the additional polymers may vary within wide range, such as from 10,000 to 1,000,000, suitably from 12,000 to 500,000, preferably from 14,000 to 350,000, more preferably from 15,000 to 250,000, most preferably from 17,500 to 175,000.

The additional polymers may be combined with poly (ethylene-2,5-furandicarboxylate) in a number of ways. A suitable way is by compounding. Other ways to make blends of polymers are also possible.

Since the additional polymers are typically selected to complement the properties of the poly(ethylene-2,5-furandicarboxylate) the additional polymer and the poly(ethylene-2,5-furandicarboxylate) are suitably provided in separate layers. These separate layers are joined on top of each other. The thus obtained multilayer composition can be prepared by co-extrusion or lamination. The separate layers may also be bonded together via an adhesive layer between two such layers. In this way the additional polymer may be selected for the most appropriate property. The thermoformed article may therefore comprise several layers of plastic. In such a multilayer article, one layer may provide the desired mechanical strength and the other layer may provide the desired barrier properties. In such a way it is suitable to have layers of poly(ethylene-2,5-furandicarboxylate) combined with one or more layers of polyolefin, e.g. polypropylene, polyethylene terephthalate, polyvinylalcohol and/or a polyamide.

The articles are formed by thermoforming. Thermoforming as a production process is known. The known process is to be adapted to the production of the desired products. Accordingly, the present invention also provides a process for the production of thermoformed articles comprising: providing a sheet that comprises poly(ethylene-2,5-furandicarboxylate) polyester, which polyester has a weight average molecular weight (Mw) of at least 50,000, determined by gel permeation chromatography using polystyrene as standard and which polyester is semicrystalline; heating the sheet to a temperature above its glass transition temperature to obtain a pliable sheet; shaping the pliable sheet in a mold to a desired shape to obtain a pliable shaped article; cooling the pliable shaped article and releasing the thus cooled shaped article from the mold.

The first step in the thermoforming process is the providing of a sheet containing the polyester. As indicated above, the sheet may consist of poly(ethylene-2,5-furandi-carboxylate)(hereinafter PEF). Such is preferred. Alternatively, the sheet may comprise a multilayer composition of separate layers, wherein at least one layer comprises the PEF polyester either as the material providing structure or as the material proving high barrier properties, in particular high gas barrier properties. Such multilayer may be a two-layer composition, e.g. PEF-polyolefin, e.g., PEF-polypropylene (PP), or PEF-poly(ethylene vinyl acetate), wherein the PEF layer provides the gas bather properties and the other layers provide a heat sealable layer, or PEF-PET or PEF-polystyrene (PS), wherein PET or polystyrene provide the structure and PEF provides the barrier properties. Compositions comprising more layers are also feasible; e.g. PET-PEF-PET, PP-PEF-PP, PS-PEF-PS, polylactic acid (PLA)-PEF-PLA or permutations thereof. The multilayer structure might also include one or more additional layers at the surface specifically to enhance or modify the sealing characteristics of the multilayer structure. For example, a heat seal layer or pressure adhesive seal layer might be included.

Particularly for multilayer structures of PEF in combination with PET or other polyesters, the ratio of the layers may be chosen in a way that allows formation of a co-polyester between them when the sheet is re-processed under specific conditions. It is common practice in thermoforming that the sheet skeleton that remains after the thermoformed articles are cut, is ground and reprocessed into new sheet, either in-line or via an off-line process using a crystallization and drying step. Particularly with multi-layer sheet this is known to cause haze and loss of functionality. The conditions and ratios that allow sufficient trans-esterification for the formation of a co-polyester that is free of haze is taught by M. E. Stewart et al. in Polymer, vol. 34 (19), page 4060-4067, for PEN (polyethylene nathalate) and PET and may be suitably adapted for PEF by the skilled person. Accordingly, the use of PEF as a single layer can avoid this issue altogether when replacing a barrier multi-layer structure such as PET-Nylon-PET or PET-EVOH(ethylene vinylalcohol)-PET. The preparation of such sheets is known in the art. Commonly the sheets are prepared by extrusion. The thickness of the sheets may be selected from a broad range. Sheets may have a thickness in the range of 20 μm to 10 mm, preferably from 75 μm to 7.5 mm, more preferably from 100 μm to 5 mm. When multilayer sheets are produced, the thickness of each layer may be in the range mentioned, so that the eventual thickness of the multilayer sheet becomes bigger. The sheets are typically produced and stored on rolls. Some people in the art may call such rolls of sheets films or rigid films. In the present specification also the phrase "sheet" also includes the thin sheets that a skilled person may describe as such "films".

The sheet may be subjected to heat setting in order to increase its crystallinity. Thereto, the sheet may be maintained at a temperature in the range of 100 to 205° C. for a period of 5 to 300 min. The sheet is suitably subjected to orientation. The orientation may be performed in the machine direction and/or the transverse direction, as is known in the art. Such an orientation step also increases the crystallinity in the sheet and/or an increased tendency to form crystals during further heating. Although not necessarily preferred, the sheet may be subjected to biaxial orientation. The polyester in the sheet that is to be used in the process is suitably semicrystalline. It has preferably a Tg in the range of 72 to 90° C., more preferably from 75 to 88° C.

The polyester that is comprised in the sheet has a Mw of at least 50,000, preferably at least 65,000, more preferably at least 69,000. Suitably it has a Mw in the range as indicated above, i.e., up to 500,000. Preferably, the Mw is suitably up to 150,000. Most preferably, the Mw of the polyester is in the range of 70,000 to 125,000.

Before shaping the sheet the sheet is heated so that the material becomes pliable. When a multilayer sheet is used the sheet is heated to at least the Tg of the polymer with the highest Tg. Typically, the sheet is heated to a temperature in the range of 90 to 200° C. Preferably the heating is done to a temperature in the range of 95 to 190° C., more preferably to a temperature in the range of 130 to 180° C. The latter temperature range is higher than the skilled person would anticipate. This is desirable in view of the semicrystalline nature of the sheet. These ranges are not limited to monolayer sheets comprising poly(ethylene-2,5-furandicarboxylate); also when multilayer sheets are used these temperature ranges tend to be feasible. It was found that when the thermoforming temperature was at the higher end of the range, the shrinkage of the resulting shaped article, when exposed to contact with hot liquids, was minimal.

The pliable sheet is subsequently shaped in a mold. Typically there are three manners in which the shaping is carried out in a thermoforming process. One way is by mechanical forming. In that way a male member is pressed into a female member with the pliable sheet in-between. A second method is by means of pressure forming. In this method a pliable sheet is pressed against the mold by creating an under-pressure or even a vacuum between the sheet and the mold, and subsequently applying air pressure above the pliable sheet, thereby pressing the sheet against the mold. A third manner is vacuum forming, wherein a vacuum is created between the pliable sheet and the mold whereby the pliable sheet is pressed against the mold, thereby inferring the desired shape to the sheet. Variations of these methods are also possible. For instance, in plug-assisted thermoforming a sheet is heated and attached to the mold. With a plug the sheet is stretched. At the end of the stretching the sheet is shaped in the mold via vacuum or via pressure. These thermoforming methods are well-known.

The thermoforming process may provide undercuts in the thermoformed article. The thermoforming process can do so very cost-effectively. Undercuts offer increased strength, a locating edge and/or a fastening point. Typically, undercuts are carried out as flanges. However, other shapes are also feasible. Sometimes the material of the sheet is sufficiently flexible and/or the undercut is small enough to allow the removal of the shaped article from the mold without having to provide for a removable part of the mold. However, undercuts often require that at least parts of the mold are collapsible or removable. That adds to the costs of the molds, but such is often quite more cost-effective than making the article using an injection molding tool.

When the pliable sheet has been shaped to obtain a pliable shaped article, the pliable shaped article is cooled. Cooling may be achieved in a variety of ways. When the mold is cool, the pliable shaped article will automatically cool and thus retain its shape. The mold may also be cooled via channels containing a cooling medium which channels are provided in the mold. Another method has been described in U.S. Pat. No. 3,744,262 wherein carbon dioxide is sprayed into a confined space wherein the pliable shaped article is. Many other methods are known as will be appreciated by the person skilled in the art. The cooling is conducted such that the shaped article is at a temperature below the glass transition temperature of the PEF polyester. Typically the shaped article is cooled to a temperature below 50° C. Most conveniently the shaped article is cooled to ambient temperature. The thus cooled shaped article may then be removed from the mold.

Alternatively, the mold is hot, e.g. at a temperature of 60 to 130° C., preferably from 70 to 90° C. That means that the polyester during thermoforming is at elevated temperature, thereby enhancing its crystallinity. The shaped article is removed from the mold at a temperature below its heat distortion temperature (determined in accordance with ASTM D648). This removal suitably takes place at a temperature of below 50° C.

Often the shaped article requires some trimming before the eventual shaped article is obtained.

Suitable shaped articles are all types of food packaging. These articles include trays, lids, containers, vessels, and similar articles. The poly(ethylene-2,5-furandicarboxylate) polyester in the articles render them very suitable for food contact. The barrier properties, both as to moisture and as to several gases, are advantageous, so that storage of foods can be done without deterioration of the quality thereof. The articles are also resistant to shrinkage and collapsing when exposed to heat. That makes the shaped articles suitable for use as food containers that are to be used in microwave ovens and as coffee capsules or noodles cups. Further examples for such applications include trays, lids and containers for cheese and meat, and containers for baby food. As the containers may be used in microwave ovens or heated air ovens, the articles can also suitably be used as airline food packaging.

The invention will be further illustrated by means of the following examples.

Example 1

A sheet of polyethylene furan-2,5-dicarboxylate (PEF) with a Mw of 71,300 was thermoformed to a cup, suitable as coffee cup. The sheet was kept at different temperatures for different periods to enhance the crystallinity, as indicated in the Table 1 below.

The sheets obtained were thermoformed in a mold via plug assisted vacuum thermoforming into cups with a height of 40 mm. The pressure applied was 5 bar. The thermoforming temperature was 180° C., and the mold temperature was 45° C.

The cups obtained were subjected to a shrinkage test. In this test boiling water was poured into the cups, the cups were retained at this condition for 15 s, and then the cups were cooled off by cold water. The heights of the cups before and after the exposure to boiling water were measured and compared to yield a shrinkage percentage. The conditions and properties of the sheets, the crystallinity of the cups and the results of the shrinkage tests are shown in Table 1 below.

TABLE 1

|  | Sheet 1 | Sheet 2 | Sheet 3 | Sheet 4 |
| --- | --- | --- | --- | --- |
| Crystallization temperature, ° C. | — | 130 | 130 | 150 |
| Crystallization period, hr | — | 0.75 | 1.0 | 0.5 |
| Crystallinity sheet, % | 1 | 26 | 28 | 26 |
| Crystallinity cup, % | 1 | 20 | 21 | n.d. |
| Shrinkage, % | 29 | 9 | 8 | 12 | n.d.: not determined

From these results it is apparent that crystallinity of the sheets has a beneficial effect on the shrinkage behavior of the resulting thermoformed article.

Example 2

A series of shrinkage tests were carried out using a reference PEF sheet 21, with a Mw of 71,300, a sheet 22 of PEF that was polymerized with pentaerythritol as branching agent and co-monomer in an amount of 0.05% wt, based on the other monomers, and a sheet 23 of PEF that was extruded with the same branching agent in an amount of 0.1% wt, based on the other monomers. The sheets were not subjected to a crystallization step, so that the crystallinity of the sheets was very low, as shown in Table 2.

These sheets were thermoformed at a temperature of 170° C. and at a pressure of below 5 bar at a mold temperature was 45° C., resulting in cups with a 40 mm height.

These cups were subjected to the same shrinkage tests as the cups of Example 1. Some sheet properties, the crystallinity of the cups and the shrinkage results are shown in Table 2 below.

TABLE 2

|  | Sheet 21 | Sheet 22 | Sheet 23 |
|---|---|---|---|
| Crystallinity sheet, % | 0 | 3 | 4 |
| Mw | 71,300 | 80,800 | 85,700 |
| Crystallinity cup, % | 1 | 4 | 6 |
| Shrinkage, % | 28 | 25 | 20 |

Although the shrinkage levels are relatively high, it is evident that the sheets with a higher Mw yield cups with a lower shrinkage. The shrinkage levels can be further decreased by increasing the crystallinity, as shown by the experiments of Example 1.

The invention claimed is:

1. A thermoformed article comprising poly(ethylene-2,5-furandicarboxylate) polyester, which poly(ethylene-2,5-furandicarboxylate) polyester (i) has a weight average molecular weight (Mw) of at least 50,000, determined by gel permeation chromatography using polystyrene as standard and (ii) is semicrystalline and (iii) essentially consists of ethylene and 2,5-furandicarboxylate moieties.

2. The article according to claim 1, wherein the polyester contains up to 5 wt % of a branching agent, based on the weight of the polyester.

3. The article according to claim 2, wherein the branching agent is selected from the group consisting of glycerol, pentaerythritol, sorbitol, hexane triol-1,2,6, trimethylol ethane, trimethylol propane and mixtures of one or more thereof.

4. The article according to claim 2, wherein the branching agent is present in the polyester in an amount of 0.01 to 2.5% wt, based on the weight of the polyester.

5. The article according to claim 1, wherein the polyester has an Mw from 70,000 to 125,000.

6. The article according to claim 1, wherein the semicrystalline polyester has a crystallinity obtained by strain inducing.

7. The article according to claim 1, wherein the semicrystalline polyester has a crystallinity of 5 to 75%.

8. The article according to claim 1, which article further comprises one or more additional polymers, in addition to poly(ethylene-2,5-furandicarboxylate), which additional polymers are selected from the group consisting of polyolefins, polystyrene, polyalkylene arylates, polyamides, polyvinylalcohol, polylactic acid, polyacrylates, polymethacrylates, polycarbonates and mixtures thereof.

9. The article according to claim 8, wherein the poly (ethylene-2,5-furandicarboxylate) polyester and the one or more additional polymers are provided in separate layers.

10. The article according to claim 8, wherein the additional polymer comprises an polyalkylene arylate.

11. The article according to claim 9, wherein an additional polymer is provided in a heat seal layer or pressure adhesive seal layer.

12. The article according to claim 10, wherein the additional polymer comprises polyalkylene terephthalate.

13. The article according to claim 12, wherein the additional polymer comprises polyethylene terephthalate.

14. A process for the production of thermoformed articles comprising:

providing a sheet that comprises poly(ethylene-2,5-furandicarboxylate) polyester, which poly(ethylene-2, 5-furandicarboxylate) polyester (i) has a weight average molecular weight (Mw) of at least 50,000, determined by gel permeation chromatography using polystyrene as standard and (ii) is semicrystalline and (iii) essentially consists of ethylene and 2,5-furandicarboxylate moieties;

heating the sheet to a temperature above its glass transition temperature to obtain a pliable sheet;

shaping the pliable sheet in a mold to a desired shape to obtain a pliable shaped article;

cooling the pliable shaped article; and releasing the thus cooled shaped article from the mold.

15. The process according to claim 14, wherein the sheet is heated to a temperature in the range of 130 to 180 ° C.

16. The process according to claim 14, wherein the pliable sheet is shaped in a hot mold.

* * * * *